(No Model.)
A. BAYLEY.
TEA AND COFFEE POT HANDLE.
No. 243,832. Patented July 5, 1881.
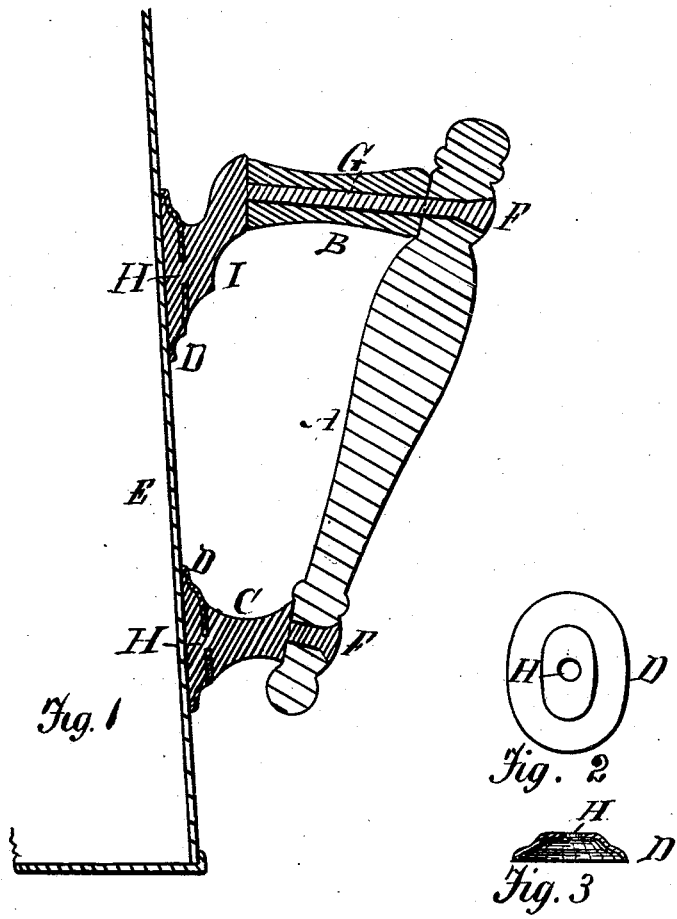
Witnesses:
Inventor:
Alfred Bayley
By Horace Harris
Atty

UNITED STATES PATENT OFFICE.

ALFRED BAYLEY, OF NEWARK, NEW JERSEY.

TEA AND COFFEE POT HANDLE.

SPECIFICATION forming part of Letters Patent No. 243,832, dated July 5, 1881.

Application filed May 2, 1881. (No model.)

*To all whom it may concern:*

Be it known that I, ALFRED BAYLEY, of Newark, in the county of Essex and State of New Jersey, have invented a new and useful Improvement in Tea and Coffee Pot Handles, of which the following is a specification.

My invention relates to tea and coffee pot handles made to protect the hand from heat, or to such construction of them that the parts coming in contact with the hand will not become heated; and it consists in the peculiar construction of the handles, made in part of wood or other non-conducting material.

Figure 1 is a section. Figs. 2 and 3 are detailed views.

The general form of my handle is shown in Fig. 1, although the form admits of variation.

The part A grasped by the hand is made of wood, either turned or cut out straight with the grain, which makes this piece strong and not liable to be broken if the tea-pot should get a fall; and, being of wood, it will not become too hot to handle. The upper section, B, of the handle is also made of wood lengthwise the grain, and as it will not get hot it shields the upper part of the hand coming against it. The lower section, C, also may be made of wood; but usually it will not be necessary, as the hand is inclined to move upward, and will rarely touch this section.

D D are recessed caps or shields, having in them the holes H, and adapted by soldering to connect the handle with the side E of a tea-pot.

In constructing my handle a mold is made from the pattern of the handle, as shown in Fig. 1, or of such other form as is desirable. In this mold is laid the section A, having through it the holes F, beveled on the outside. Section B is also laid in, having the hole G lengthwise through it and corresponding with the hole F. The shields D are also laid in the mold edgewise. The mold is then closed and turned so that the shields are up, when some suitable molten metal is poured in through the holes H in the shields, which forms the sections C and I and fills up the recesses in the shields, and also the holes F and G, which filling, by means of the bevel in the hole F in section A, unites and holds the parts perfectly together; or, instead of the poured metal going through the section A, screws may be put through this section from the outside and extend beyond it into the hole in section B, and also in section C. When the metal is poured as above named it will close in about the screw-threads and bind the parts firmly; or a metal pin may be put in with the head, filling the beveled holes F, and may have openings transversely through the ends, taking the place of the screw-threads, and the molten metal, closing around the pins and into the openings, will hold all in place.

I claim—

1. A tea and coffee pot handle having the sections A and B of non-conducting material, and having a metal connection with each other and with the tea-pot, substantially as and for the purpose specified.

2. The sections A and B and the shields D, having a connection by means of cast metal, substantially as and for the purpose set forth.

3. The combination of the non-conducting sections A and B and the metal sections C and I, making connection with the sections A and shields D, substantially as set forth.

ALFRED BAYLEY.

Witnesses:
HORACE HARRIS,
SAMUEL G. DAVIS.